May 30, 1939.  E. J. KINGSBURY  2,160,217
MACHINE TOOL UNIT WITH FEEDING MECHANISM
Filed Jan. 23, 1936   2 Sheets-Sheet 1

Inventor
Edward J. Kingsbury
By Mason Fenwick
Attorneys

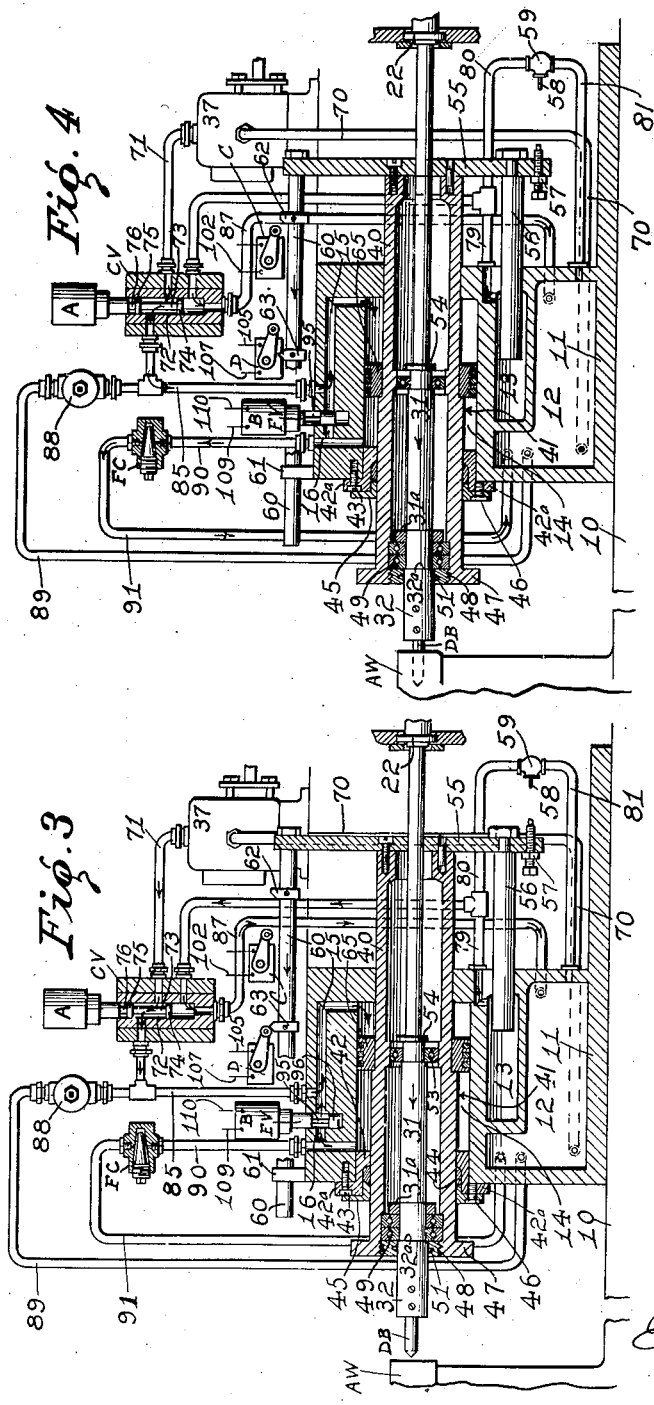

Patented May 30, 1939

2,160,217

UNITED STATES PATENT OFFICE 2,160,217

MACHINE TOOL UNIT WITH FEEDING MECHANISM

Edward Joslin Kingsbury, Keene, N. H.

Application January 23, 1936, Serial No. 60,502

12 Claims. (Cl. 60—52)

This invention relates to a machine tool unit having a feeding mechanism for producing a movement of the tool relative to the work. Such an arrangement is particularly advantageous when employed in an assembly constituting a complex machine tool of the type described in Patent No. 1,975,005, granted to Edward J. Kingsbury and Gunnar Swahnberg, September 25, 1934; and in Patent No. 2,011,487 granted to Edward J. Kingsbury, August 13, 1935, and Patent No. 1,975,007 granted to Edward J. Kingsbury, September 25, 1934.

One of the features of the present invention is the provision of a hydraulic system for producing a traversing and/or feeding by hydraulic means.

Another feature of the present invention is the coordination of the parts of a hydraulic feeding system for such a tool by a supervisory electrical system for controlling the flow of the liquid.

A further feature of the present invention is the provision of a fluid-operated system for producing relative movements of the tool and work under control of an electrical system which determines the direction and rate of the feeding and/or traverse movements.

A further feature of the present invention is the provision of a hydraulic feeding system including a cylinder and piston with a by-pass for permitting the passage of liquid from one side of the piston to the other during rapid traverse, and with externally controlled means for closing the by-pass.

One form of construction of the invention is shown on the accompanying drawings, by way of illustration, in which Figure 1 represents an upright section through the spindle and feeding cylinder of a drilling machine, together with a conventional diagram of the circuits of the electrical control system.

Figures 3 and 4 are sectional views generally similar to Figure 1, the former illustrating the position of the parts during a rapid traverse movement, and the latter during a feed movement.

Figures 1, 2:
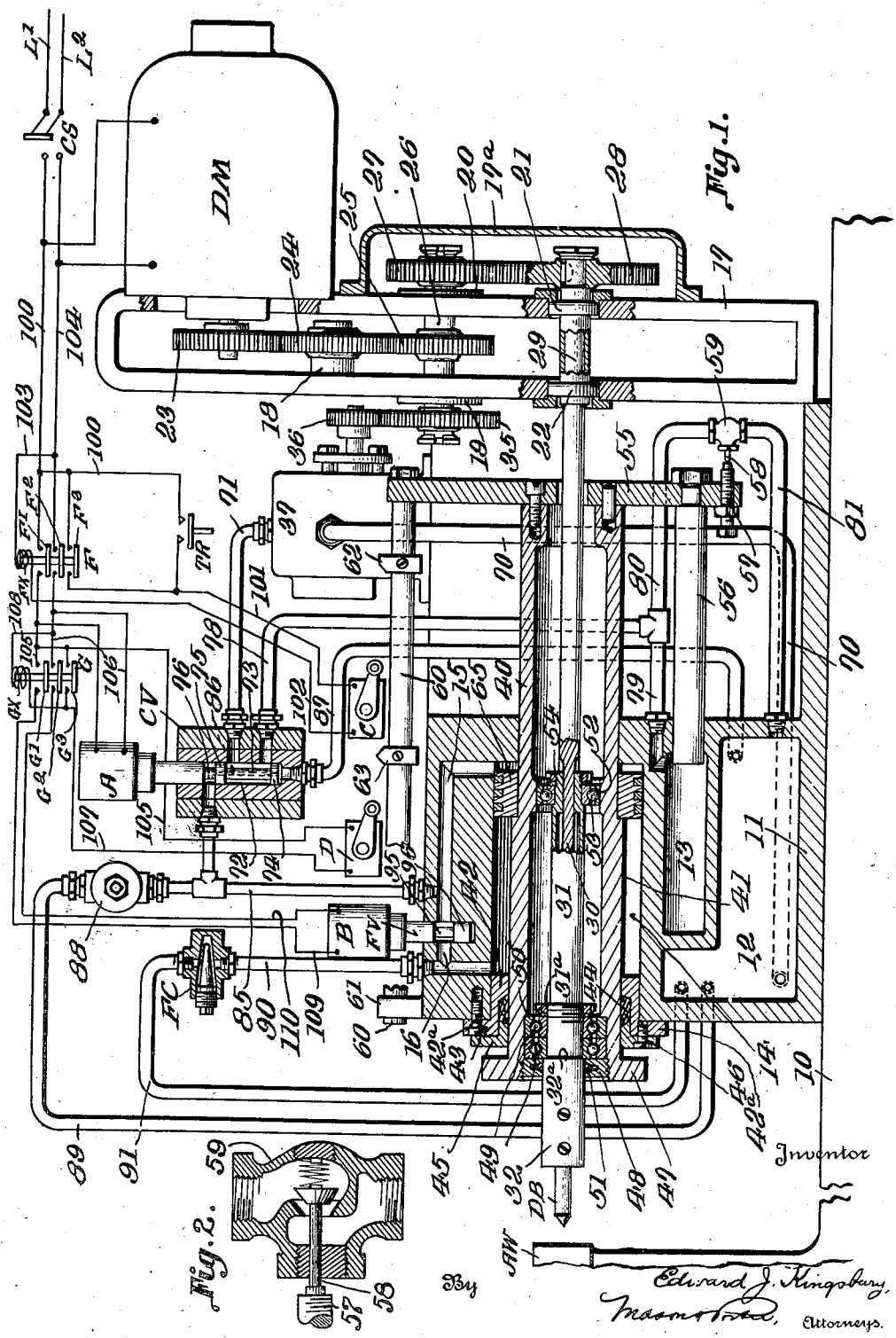
Figure 2 is a detail view, on a larger scale, showing a relief valve.

In the drawings, a base 10 supports an article of work AW upon which a drilling operation is to be performed by the drill DB. The base 11 of the machine tool unit is suitably mounted and secured upon the machine base 10, and provides an oil sump 12, a return cylinder 13, a main cylinder 14, and a passage 15, 16 providing a by-pass from one end of the main cylinder 14 to the other. A rear portion 17 of the frame 11 extends upwardly and provides a support for the driving motor DM, and also bearings 18, 19, 20, 21, 22 for shafts driven from the driving motor DM. The motor DM drives a motor gear 23 which is in mesh with an idler gear 24 supported from bearing 18, and this idler gear 24 in turn is in mesh with a gear 25 fixed on shaft 26 which is supported by bearings 19 and 20.

The shaft 26 carries a pick-off gear 27 which is in mesh with a second pick-off gear 28 on the spindle shaft 29, which extends into the spindle structure which will be described hereinafter, and is splined at its forward end 30 for driving engagement with the spindle 31 which has a head 32 for receiving the drill DB. The spindle shaft 29 is supported for rotation by the bearings 21, 22. It will be understood that the pick-off gears 27, 28 may be changed as desired for determining the rotational speed of the drill DB, in the usual way, and that these pick-off gears are normally protected by a guard 17a fastened to the upright frame portion 17.

The shaft 26 also carries a gear 35 which is in mesh with a driving gear 36 of a constant volume pump 37 which may be of the gear type, and is supported on the upper portion of the machine unit base structure 11.

The reciprocating or spindle structure comprises a hollow body having a smaller external diameter 40 which closely fits a rear aperture in the machine base structure 11 at the rear end of the main cylinder 14, and having a larger diameter 41 which fits an opening in the closing ring 42 at the front end of the main cylinder 14. This closing ring has a flange 42a through which pass the screws 43 for securing this closing ring to the front of the base structure 11. A packing 44 may be employed for closely fitting and sealing the larger diameter 41, and this packing is held in place by a gland member 45 secured by screws 46. The front end of this hollow spindle structure has a flange 47, and threadedly receives the internal clamping member 48 which holds the anti-friction bearings 49 tightly against a shoulder 50 within the hollow structure. The spindle 31 is received by these anti-friction bearings 49 and has a shoulder 32a engaged with one of the axle races thereof, while a clamping nut 31a maintains the relative position of the spindle with respect to the hollow structure. Penetration of dirt to the anti-friction bearings 49, or leakage of lubricant therefrom may be eliminated by a further packing 51. Intermediate the length of the hollow spindle structure is provided an internal bearing surface 52 for receiving the hub race of a further anti-friction bearing 53 which is mounted adjacent the rear end of the spindle 31, and is secured thereat by a clamping nut 54. Thus the spindle is mounted on anti-friction bearings adjacent both ends.

At the rear end of the externally projecting smaller diameter 40 is provided a plate member 55 which extends downwardly in the illustrated form, and is secured to the piston 56 for the return cylinder, and also supports an adjustable abutment screw 57 for engagement with the stem 58 of the normally closed valve 59, which is shown in open position in Figure 2. This plate 55 also extends upwardly in the illustrated form, and is connected to the sliding bar 60 which is also guided by a bracket 61 on the base structure 11. This sliding bar 60 carries the dogs 62, 63 for actuating the electrical control system.

The hollow spindle structure is provided with a piston sleeve 65 which is fixedly secured thereto by a forced fit, or otherwise, to maintain this sleeve 65 at a predetermined point of the length of the hollow spindle structure.

The illustrated hydraulic traversing and feeding system includes the supply pipe 70 which is in communication with the oil sump 12 at a low point thereof, and is connected to the pump 37. As the pump is driven from the driving motor DM, the oil is withdrawn from the sump and delivered through a fluid pressure conduit 71 to a change-over valve structure CV. This change-over valve structure has a housing providing internally a cylinder wall 72 in which moves a valve having a reduced portion 73 and enlarged ends 74 and 75 which closely fit the cylinder 72, and a second reduced portion 76. The valve is raised by a solenoid A and is returned to the lowered position, as shown on the drawings, for example by gravity, or as shown in the Foster Patent 1,987,555. The fluid-pressure conduit 71, in the position of parts shown, opens into the cylinder 72 opposite the reduced portion 73, so that the fluid may pass therefrom into a conduit 78 which has a branch 79 communicating with the return cylinder 13, and a further branch 80 communicating with the normally closed valve 59, and thence by conduit 81 with the sump 12. This is the position of parts for holding the spindle structure in withdrawn position. The fluid under pressure from conduit 71 passes to conduit 78 and thence to the return cylinder, and also through the valve 59 (now held open by the abutment screw 57), and thus by conduit 81 back to the sump.

In this position of the parts, also, the conduit 85, which is branched from the passage 15 within the base structure 11, is in communication with the cylinder 73 at the second reduced portion 76 of the change-over valve structure, so that a passage is provided therefrom by the axle hole 86 in the change-over valve body to the lower end of the cylinder 72, and thence by a return conduit 87 back to the sump 12.

Further, the conduit 85 has a branch leading through the pressure-responsive relief valve 88 and by conduit 89 back to the sump 12.

The passage 16 within the base structure 11 communicates by a conduit 90, and a regulating or feed control valve FC, with the conduit 91 which also leads back to the sump 12.

The passages 15 and 16 within the base structure 11 may be shut off from one another by a feed limiting valve FV which has a reduced portion 95 and a lower end portion 96 closely fitting the corresponding opening in the base structure and which is adapted, upon raising of the valve body FV, to shut off communication between the passages 15 and 16. This valve body FV is raised upon energization of the solenoid B, and is lowered when the solenoid B is de-energized, as described for the valve CV.

The dogs 62 and 63 selectively operate the forward limit switch C and the switch D which determines the point of changing from the rapid forward traverse to the slow working feed.

The electrical control system is supplied from the line conductors L1, L2 through a control switch CS. When this control switch is closed, current is supplied to the driving motor DM (illustrated as a single phase motor) and also to the control system proper. The conductor 100 leads to a contact for bridge F3 of the "forward" relay F and to the normally open tripping switch TR which is connected by a conductor 101 with the other contact for the bridge F3, and also with a contact of the withdrawal limit switch C. A conductor 102 connects the other contact of the normally closed withdrawal limit switch C with one terminal of the coil FX of the relay F. A conductor 103 connects the other terminal of coil FX with a return conductor 104. The conductors 100, 104 are also connected with contacts of bridges F1 and F2 of the relay F. The bridge F1 upon closing permits current to flow from conductor 100 to conductor 105 which is connected to the solenoid A, from which current returns by conductor 106 to bridge F2, and thence to the return conductor 104. Conductor 105 is also connected to contacts of bridges G1 and G3 of a relay G, and also to one contact of the normally open speed-change switch D. The other contact of the switch D is connected by a conductor 107 with the other contact of bridge G3, and also with one terminal of the coil GX of the relay G. The other terminal of the coil GX is connected by a conductor 108 with the return conductor 106. From the other contact of bridge G1, a conductor 109 leads to solenoid B with a return by conductor 110 to a contact of bridge G2, and thence to the return conductor 106.

The operation of the system is as follows:

With the parts in withdrawn position as shown in Figure 1 of the drawings, and the switch CS closed, the driving motor is rotating the spindle through the aforesaid gears and shafts, and also is driving the pump 37 so that substantially a constant volume of fluid is being delivered therefrom. This fluid flows by conduit 71 to the annular space around the reduced portion 73 of valve CV, and thence by conduits 78, 80, open valve 59, conduit 81, back to the sump. Any excess of pressure in conduit 78 over the pressure at the sump is operative through conduit 79 for maintaining the piston 56 of the return cylinder 13 in the withdrawn position shown. The switch C is closed and the switch D open. The solenoids A and B are deenergized, and the valve bodies of change-over valve CV and the feed-limiting valve FV are in the illustrated position, so that the by-pass from end to end of the main cylinder 14 is kept open by passages 15, 16.

When the tripping switch TR is closed, current may flow by the path established through conductor 100, switch TR, conductor 101, closed limit switch C, conductor 102, coil FX, conductor 103, conductor 104, and back to the line. "Forward" relay F is energized and its contact bridges closed. Current now flows also in a maintaining circuit from conductor 100, by switch bridge F3, and shunts the tripping switch TR. Current also flows through bridges F1 and F2 by conductors 105, 106 and the solenoid A, so that the change-over valve CV is raised until the lower large head 74 shuts off the conduit 78 from conduit 71, while the upper head 75 moves to a point above the port for conduit 85, and fluid now passes from conduit 71 through the space around the reduced portion 73 of the valve CV into the conduit 85. See Figure 3. Thus it moves into the bypass 15, 16 between the ends of the main cylinder 14. It will be noted that the differentials of pressure at the two ends of the cylinders, between the fluid under pressure and the atmosphere, establish a differential in the inch pounds of pressure being exerted. Thus, in the left-hand end of the cylinder, the atmosphere operating upon the larger diameter and the fluid-pressure within the left-hand end of the large cylinder 14 and operating upon the left-hand face of the piston 65, have a lesser total effect than the fluid pressure in the right-hand end of the main cylinder 14 (considering the greater width of the annular space between surface 40 and the wall of the cylinder 14 relative to the space between the larger diameter 41 and said wall) and the effective atmospheric pressure operating at the right-hand end of the hollow spindle structure. Considering the matter on the basis of the differential of areas at the two sides of the piston, the piston 65 will be moved toward the left at a rate governed by the delivery from the pump 37. If it is assumed that the total exposed area to the right of the piston is 11 sq. in. and to the left of the piston is 10 sq. in., this differential is 1 sq. in. If the pump delivery be assumed to be 1 gallon per minute, then (231 cu. in. to the gallon) the piston is theoretically fed to the left at the rate of 231 in. per minute. The oil in the left-hand end of the cylinder is moved into the conduit 16 and joins the oil coming from conduit 85.

This rapid forward traverse of the piston 65 (see Figure 3) causes the hollow spindle structure to be moved therewith, and the plate 55 moves also toward the left. The valve 59 closes, but no action occurs as the conduit 80 is substantially without pressure, and a free escape for the fluid in the return cylinder 13 is afforded by conduits 79, 78 into the lower end of cylinder 72 below the head 74, and by conduit 87 back to the sump. Since essentially no resistance is opposed to this rapid traverse movement, and the total output of the pump is accepted, the relief valve 88 does not open, and the flow through feed control valve FC is too small to cause any substantial change in the effect.

Ultimately the dog 63 encounters the actuator structure of the speed-changing switch D and moves the latter from open to closed position. Current now flows from conductor 105 through the switch D, and by conductor 107 to coil GX, and back by conductors 108, 106, bridge F2, conductor 104 to the line. Relay G is energized and closes its bridges. The bridge G3 establishes a maintaining circuit through the coil GX in shunt of the switch D. Bridges G1 and G2 permit current to pass by conductors 109, 110 to solenoid B, and this solenoid is energized and raises its valve FV. The fluid remaining in the left-hand end of the main cylinder 14 is thus prevented from moving by passage 16 into passage 15, and it can only escape through the feed control valve FC; and hence adjustment of this valve will determine the rate at which fluid may escape from the left-hand end of the cylinder, and thus will determine the rate of the slow feeding motion while the drill DB is operating on the work AW.

The hollow spindle structure continues to advance at this slow rate. The excess of fluid from the constant volume pump 37 causes a high pressure to build up in the right-hand end of the main cylinder 14 until the relief valve 88 opens for maintaining this predetermined high working pressure; and hence an easily regulated but powerful feeding is produced.

Ultimately the dog 62 encounters the limit switch C which determines the forward limit of feeding movement. This switch is opened, and therewith the current is interrupted in its flow to coil FX, so that the relay F opens. The solenoid A is de-energized and also the coil GX of relay G, so that relay G opens, and also the solenoid B is de-energized. The valves CV and FV return to the position illustrated on the drawings.

Fluid from the conduit 71 now flows past the annular space around the reduced portion 73 into conduit 78 again, and thus by conduit 79 to the return cylinder 13, and operates on the small diameter piston 56 to produce a rapid return traverse until the parts of the hollow spindle structure and its plate 55 are returned to the position shown, that is, until the abutment screw 57 opens the valve 59 to permit a release and discharge of the pressure of fluid from the pump 37. During the return movement of the piston 65, the fluid in the right-hand end of the main cylinder 14 is forced through the by-pass conduit 15, and thus past the reduced portion 95 of valve FV to conduit 16, and thus into the left-hand end of the main cylinder 14. The quantity so ejected from the right-hand end of the cylinder is, however, in excess of that required at the left-hand end, and this excess passes by conduit 85 to the change-over valve CV and into the annular space around the reduced portion 76 thereof, and thus through the central passage 86 to the lower end of the valve, and is discharged by conduit 87 back to the sump.

This operation is repeated as soon as the tripping switch TR is closed again. This closing of the tripping switch TR may be accomplished manually to produce a semi-automatic machine; or it may be accomplished mechanically as proposed for the initiating devices for the tool units in the aforesaid patents, whereby an entirely automatic mechanism is produced with a control on the tool unit and on the work holder for proper sequential actuation.

It is obvious that the invention is not limited to the form of construction shown, but that it may be practiced in many ways within the scope of the appended claims.

I claim:

1. A feeding mechanism for a machine tool including a fixed structure and a movable structure, a pump, a cylinder and a piston, conduits establishing communication between the pump and the ends of the cylinder including a by-pass between said ends effective during forward and reverse traverse movements of the movable structure to permit free passage of pressure fluid between the respective ends of said cylinder, a valve for closing the by-pass, a constantly open discharge conduit from one end of the cylinder and including a feed control valve effective to control feed movements of the movable structure and to relieve pressure in the by-pass during traverse movements of said movable structure, and means responsive to the relative movement of the fixed and movable structures for closing said by-pass valve upon a predetermined forward traverse movement of said movable structure to cause the feed control valve to take over control of the further or feed movement of said movable structure and for opening the by-pass valve at the completion of said feed movement to prepare the by-pass for permitting free pressure fluid passage during reverse traverse movement of said movable structure.

2. A feeding mechanism for a machine tool including a fixed structure and a movable structure, a pump, a cylinder and a piston providing chambers of different cross-sectional areas at the two faces of the piston, conduits establishing communication between the pump and the ends of the cylinder including a by-pass between said ends effective during forward and reverse traverse movements of the movable structure to permit free passage of pressure fluid between the respective ends of said cylinder, a valve for closing the by-pass, a constantly open discharge conduit from the end of the cylinder having a smaller cross-sectional area and including a feed control valve effective to control feed movements of the movable structure and to relieve pressure in the by-pass during traverse movements of said movable structure, and means responsive to the relative movements of the fixed and movable structures for closing said by-pass valve when the movable structure has made a predetermined forward traverse movement of said movable structure to cause the feed control valve to take over control of the further or feed movement of said movable structure and for opening the by-pass valve at the completion of said feed movement to prepare the by-pass for permitting free pressure fluid passage during reverse traverse movement of said movable structure.

3. A feeding mechanism for a machine tool including a fixed structure and a movable structure, a constant volume pump, a main cylinder having a main piston therein, said main cylinder and piston being constructed and arranged to have different cross-sectional areas of the spaces at the two faces of the piston, a return cylinder having a return piston of small effective area therein, said cylinders and pistons being connected to said structures for producing movement of the movable structure, conduits establishing communication between the pump and the cylinders and including a by-pass between the ends of said main cylinder, a change-over valve located in the conduit from the pump and operating selectively to control the passage of fluid from the pump to the main cylinder and to the return cylinder, a valve for closing said by-pass, a discharge conduit from the end of the main cylinder having the space of smaller cross-section and including a feed control valve, a discharge conduit from the end of the main cylinder having the space of larger cross-section and including pressure relief means, means responsive to the relative movement of the fixed and movable structures for closing said by-pass valve upon a predetermined forward movement of said movable structure and for opening the by-pass valve at the completion of a further predetermined forward movement thereof and therewith of moving the change-over valve for producing a flow of fluid to the return cylinder, means operated from the movable structure for by-passing fluid around the return cylinder in the withdrawn position of the movable structure, and means for moving the change-over valve for effecting movement of fluid from the pump to the main cylinder for starting a new cycle.

4. A feeding mechanism for a machine tool including a fixed structure and a movable structure, a pump, a main cylinder and a main piston for producing forward movement of the movable structure, a return cylinder and piston for producing withdrawal movement of the movable structure, conduits establishing communication between the pump and cylinders and including a by-pass between the ends of the main cylinder, a constantly open discharge conduit from one end of the main cylinder and including a feed control valve, a valve for closing the by-pass, and a change-over valve for selectively effecting the movement of fluid from the pump to the main cylinder and from the pump to the return cylinder, means responsive to the relative movement of the structures for closing said by-pass valve upon a predetermined forward movement of said movable structure so that the feed control valve will determine the rate of escape of fluid from the corresponding end of the main cylinder and thereby limit the rate of forward movement, said responsive means also operating for opening the by-pass valve at the completion of a further predetermined forward movement of the movable structure and operating to shift said change-over valve for effecting the return movement of the movable structure.

5. A feeding mechanism for a machine tool including a fixed structure and a movable structure, a pump, a cylinder and a piston connected for moving said movable structure, conduits establishing communication between the pump and the ends of the cylinder including a by-pass between said ends effective during forward and reverse traverse movements of the movable structure to permit free passsage of pressure fluid between the respective ends of the cylinder, a constantly open discharge conduit from one end of the cylinder and including a feed control valve effective to control feed movements of the movable structure and to relieve pressure in the by-pass during traverse movements of said movable structure, a valve for closing the by-pass to cause the feed control valve to take over control of feed movement of said movable structure, electrically actuated means for moving said by-pass valve, contact means on the structures actuated upon a predetermined forward traverse movement of the movable structure, and circuit means including the contact means and electrically actuated means effective for producing a closing of said by-pass valve to initiate said controlled feed movement.

6. A feeding mechanism as in claim 5, in which said responsive means is further operative upon completion of a predetermined amount of said feed movement of the movable structure for reopening the by-pass valve to prepare the by-pass for permitting free pressure fluid passage during reverse traverse movement of said movable structure.

7. A feeding mechanism for a machine tool including a fixed structure and a movable structure, a pump, first and second fluid-operated means connected for producing forward and backward movements of the movable structure, said first fluid-operated means including a feed control pump, conduit means establishing communication between the pump and the fluid-operated means, a change-over valve in said conduit means for determining the direction of flow of the fluid to said fluid-operated means and therewith the direction of movement of the movable structure, a constantly open discharge conduit from the feed control pump and including a feed control valve, a feed limiting valve for compelling fluid being exhausted from said feed control pump during forward movement of the movable member to move through the feed control valve, electrically actuated means for moving said change-over valve and said feed limiting valve, and means responsive to the relative movement of the structures for closing said feed limiting valve upon a predetermined forward movement of said movable structure so that the feed control valve operates to determine the escape of fluid from the fluid control pump and operating upon a further predetermined forward movement for shifting said change-over valve for effecting a backward movement of the movable structure and for opening said feed limiting valve for permitting a quick filling of the feed control pump and a quick discharge of said first fluid-operated means.

8. A feeding mechanism for a machine tool including a fixed structure and a movable structure, a pump, cylinder and piston means including a main cylinder and a main piston, conduits establishing communication between the pump and the cylinder and piston means including a by-pass between the ends of the main cylinder, a discharge conduit from one end of the main cylinder and a feed control valve therein, an electrically actuated valve for closing said by-pass, an electrically operated change-over valve in said conduits for controlling the flow of fluid to said main cylinder for forward movement of the movable structure, cooperative switches and actuating dog means on said structures, one said switch being normally closed and another being normally opened, a tripping switch, and circuit means connected to said electrically actuated valves and switches for opening said change-over valve when the tripping switch is closed whereby to effect a rapid forward traverse of the movable structure, and for closing said by-pass valve when one said dog closes said normally open switch whereby to effect a slow forward feeding supervised by said feed control valve, and for effecting the re-opening of said by-pass valve and reclosing of said change-over valve when said normally closed switch is opened.

9. A feeding mechanism as in claim 8, in which the cylinder and piston means includes a return cylinder and return piston, and in which the change-over valve operates for selectively effecting the flow of fluid toward the main cylinder and from the return cylinder, or toward the return cylinder and from the main cylinder, and including fluid-release means operated by the movable structure at return to withdrawn position for permitting the flow of fluid in by-pass around the return cylinder.

10. A feeding mechanism for a machine tool including a fixed structure and a movable structure, a pump, a cylinder, and a piston providing chambers of different cross-sectional areas at the two faces of the piston, a conduit establishing communication between the pump and the end of the cylinder having the larger cross-sectional area, means providing a by-pass between the ends of said cylinder effective during forward and reverse traverse movements of the movable structure to permit free passage of pressure fluid between the respective ends of the cylinder, a valve for closing the by-pass, a constantly open discharge conduit from the end of the cylinder having the smaller cross-sectional area whereby to provide a choke control for feed movements of the movable structure and to relieve pressure in the by-pass during traverse movements of said movable structure, and means responsive to the relative movements of the fixed and movable structures for closing said by-pass valve upon a predetermined forward movement of said movable structure to cause the choke control to become effective for controlling a feed movement of said movable structure and for opening the by-pass valve at the completion of said feed movement to prepare the by-pass for permitting free pressure fluid passage during reverse traverse movement of said movable structure.

11. A feeding mechanism for a machine tool including a fixed structure and a movable structure, a pump and means for driving the same for producing a substantially constant delivery therefrom, a main motor cylinder having a differential piston therein so that the cross-sectional areas differ at the two faces of the piston, a return cylinder having a piston therein, said pistons being connected to said movable structure; a reversing valve supplied with fluid from said pump, a first conduit from the reversing valve to the end of the cylinder having the larger cross-sectional area, a branch from said first conduit including automatic relief means for the release of fluid when a pressure exceeding a predetermined value is present in said first conduit, a second conduit from said reversing valve to the return cylinder for energizing the same, means providing a by-pass between the ends of said main cylinder, a valve for closing the by-pass, a constantly open discharge conduit from the end of the cylinder having the smaller cross-sectional area, feed control means for limiting the flow of fluid through said discharge conduit; and means responsive to the distance of movement of said movable structure for selectively actuating said valves for effecting a rapid forward movement with the by-pass valve open, a further slow forward movement with the by-pass valve closed and the automatic relief means operating, and a return movement with the by-pass valve open.

12. A feeding mechanism as in claim 11, and including also a further branch conduit communicating with said second conduit, and a relief valve in said further branch conduit, and means on the movable structure for opening said relief valve at the completion of the return movement of the movable structure so that the fluid from said pump may move through the reversing valve and said second relief valve and permit the continued operation of the pump with the structures at a standstill in withdrawn position.

EDWARD JOSLIN KINGSBURY.